Patented Dec. 6, 1938

2,139,570

UNITED STATES PATENT OFFICE 2,139,570

THIAZOLE COMPOUNDS AND MANUFACTURE THEREOF

Hans Andersag and Kurt Westphal, Wuppertal-Elberfeld, Germany, assignors to Winthrop Chemical Company, Inc., New York, N. Y., a corporation of New York No Drawing. Application April 22, 1936, Serial No. 75,865. In Germany May 2, 1935

32 Claims. (Cl. 260—302)

This invention relates to thiazole compounds and to a process of preparing the same.

In accordance with the present invention 4-alkyl-5-hydroxyalkyl-thiazoles and intermediate products for the maufacture of the said compounds are obtainable by reacting upon an aliphatic ketone containing in the α-position to the keto group a reactive substituent, for instance, a halogen atom and containing attached to the carbon atom bearing the said reactive substituent an alkyl group which is substituted by a substituent which is capable of being transformed into a hydroxyl group, such as esterified hydroxyl groups, halogen atoms, carboxylic, carbalkoxy and carboxylic acid amide and hydrazide groups, with a rhodanide and treating the reaction product obtained with an acid containing agent to effect ring closure to the thiazole ring system, the substituents of the alkyl groups which are capable of being transformed into the hydroxyl group may be subsequently converted into the said group. Suitable ketones of the kind specified are for instance esters of 1-hydroxy-2-halogen-3-oxobutane with hydrohalic acids or with organic acids, such as formic, acetic, oxalic, propionic, benzoic, chloro- and nitrobenzoic acid, furthermore, the homologues of the said compounds in which the halogen atom or another reactive substituent stand in α-position to the keto group may be employed, for instance, esters of 1-hydroxy-3-halogen-4-oxo-pentanes or of 1-hydroxy-2-halogen-3-oxo-pentanes, etc. The substituent of the alkyl group which is convertible into the hydroxyl group is transformed into the said group in the manner known per se; organic acyl radicals for instance are split off by means of saponifying agents, preferably such of alkaline reaction, likewise halogen atoms are transformed into hydroxyl by means of alkaline reacting media. Carboxylic and carbalkoxy groups are first transformed into carboxylic acid amide or hydrazide groups and the latter groups are converted into the amino group by Hoffmann's or Curtius' reaction, the amino group being finally converted into the hydroxyl group as mentioned before. For instance, when using 3-halogen-4-oxo-pentane-carboxylic acid esters or their homologues in which the halogen atoms stands in α-position to the keto group for the condensation with the rhodanide, the 4-alkyl-thiazole-5-alkyl carboxylic acid esters first formed may be transformed into the corresponding 5-hydroxyalkyl compounds by reduction of the carboxylic acid ester group in the manner known per se, or by Hoffmann's or Curtius' reaction as indicated above. The condensation to the thiazole compound is advantageously performed in the presence of a solvent or diluent, such as water, alcohol, acetone. As the rhodanides preferably alkali or alkaline-earth metal salts are employed. The keto rhodanides first formed with the separation of the metal halide are condensed to 2-hydroxy-thiazoles by treatment with acid condensing agents, particularly with strong acids, such as hydrohalic acid and sulfuric acid.

When using in the described reaction for instance γ-bromo-γ-acetopropylalcohol-acetate and barium rhodanide, the reaction proceeds according to the following reaction scheme:—

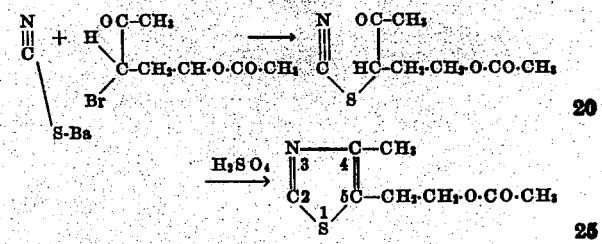

The hydroxyl group standing in the 2-position of the thiazole compounds obtained in the above described manner, may be converted into hydrogen in the manner known per se. The hydroxy group is first converted into halogen, preferably by means of a phosphorus halide and the halogen atom is replaced by hydrogen by the action of a reducing agent, such as zinc dust.

The 4-alkyl-5-hydroxy alkylthiazoles and their derivatives are useful as initial materials for various chemical processes. They may, for example, be employed in the production of antineuritic agents by reacting them with a pyrimidine compound containing a reactive constituent in the presence of a high boiling solvent while heating, as disclosed in our copending application Ser. No. 75,864, filed April 22, 1936.

The invention is further illustrated by the following examples without being restricted thereto:

*Example 1.*—144 grams of acetopropylalcohol-acetate (compare Berichte der Deutschen Chem. Ges. 22, page 1196) are dissolved in 300 ccs. of absolute ether and 160 grams of bromine are added drop by drop while cooling. After the bromination the ether is washed with ice water and sodium carbonate solution, the solution is dried with calcium chloride and the ether is evaporated in vacuo. The residue is mixed with 100 ccs. of alcohol, and 200 grams of barium thiocyanate and the mixture is stirred for 24 hours. The reaction takes place with heating. After the addition of water until the barium bromide separated has dissolved, the mixture is extracted with ether, the ethereal solution washed with water and the ether is evaporated. The residue is dissolved in 100 ccs. of acetic acid, 5 ccs. of concentrated sulfuric acid are added and the mixture is heated for 2 hours to 90–100° C. The reaction liquid is poured into ice water, neutralized with alkali while strongly cooling and the thiazole formed is extracted with ether. The 2-hydroxy-4-methyl-5-acetoxyethyl-thiazole, melting at 87° C., crystallizes on concentrating and cooling of the ethereal solution.

20.1 parts by weight of the 2-hydroxy-4-methyl-5-acetoxyethyl-thiazole are heated to boiling with 100 parts by weight of phosphorus oxychloride for 2 hours. The excess phosphorus oxychloride is removed by means of vacuum distillation and the residue is treated with cold water and sodium carbonate. Then the mixture is extracted with ether and the ethereal solution is dried over calcium chloride and distilled. The 2-chloro-4-methyl-5-acetoxyethyl-thiazole is obtained as a colorless oil boiling at 104° C. under 0.2 mm. pressure.

4 parts by weight of this product are dissolved in 15 parts by weight of glacial acetic acid at 60° C. and reduced in small parts with 5 parts by weight of zinc dust. After reaction has taken place the mixture is diluted with water, neutralized with sodium carbonate while cooling and the 4-methyl-5-acetoxyethyl-thiazole is separated by extraction with ether and evaporation of the solvent. Its picrate melts at 133° C.

For splitting off the acetyl group the acetate is boiled for one hour with alcoholic caustic potash solution, the alcohol is removed by means of steam and the residue extracted with ether. After drying with potassium carbonate the solvent is evaporated and the crude base purified by distillation. The 4-methyl-5-hydroxyethyl-thiazole forms a viscous colorless oil boiling at 135° C. under 7 mm. pressure. Its picrate forms long needles melting at 164° C.

*Example 2.*—158 parts by weight of γ-acetobutyric acid ethylester (compare Helv. Chim. Acta II (1919) p. 152) are brominated in accordance with Example 1 in 300 ccs. of absolute ether with 160 grams of bromine and converted into the crude thiocyano-γ-acetobutyric acid ethylester by means of 200 grams of barium thiocyanate. Ring closure to the thiazole is effected by 2 hours boiling with about 10% alcoholic sulfuric acid.

40 parts by weight of the 2-hydroxy-4-methylthiazolyl-5-propionic acid ethyl ester thus obtained are heated to boiling with 160 grams of phosphorus oxychloride for 2 hours under reflux. After evaporation of the excess phosphorus oxychloride in vacuo the mixture is treated with cold water and sodium carbonate while cooling and the 2-chloro-4-methyl-thiazolyl-5-propionic acid ethyl ester separating is purified by distillation. It boils under 7 mm. pressure at 148–150° C.

The chlorine atom in 2-position is replaced by hydrogen in accordance with Example 1 by treatment with zinc dust and glacial acetic acid. The 4-methylthiazolyl-5-propionic acid ethyl ester thus obtained boils at 130–132° C. under 7 mm. pressure.

19.9 parts by weight of the 4-methylthiazolyl-5-propionic acid ethyl ester are heated with 250 ccs. of methyl alcoholic ammonia saturated at 0° C. for 12 hours to 120–130° C. in an autoclave. After cooling the methyl alcohol is evaporated. The residue becomes crystalline by triturating with ether. In this manner colorless crystals of the 4-methyl-5-thiazolyl propionic acid amide melting at 96° C. are obtained from alcohol-ether.

7.7 parts by weight of this compound are finely powdered and covered with a cold solution of 7.3 parts by weight of bromine in 100 parts by weight of 2.5-normal aqueous potassium hydroxide solution and stirred until solution has taken place. 15 parts by weight of potassium hydroxide are then added and the solution is heated to 90–100° C. for 2 hours. The solution is saturated with potassium carbonate and repeatedly extracted with ether. After drying over calcined potassium carbonate the solvent is evaporated and the residue distilled. The 4-methyl-5-aminoethyl-thiazole boils at 103° C. under 7 mm. pressure. Its hydrochloric acid salt forms colorless needles at 246° C. Its picrate melts at 227° C.

The same compound is obtained by heating to boiling 4-methyl-thiazolyl-5-propionic acid ethyl ester in alcoholic solution with excess hydrazine hydrate for 3 hours, removing the alcohol and the hydrazine and treating the crude 4-methyl-thiazolyl-5-propionic acid hydrazide formed in 20% hydrochloric acid while cooling with the calculated quantity of sodium nitrite and by splitting the azide by 2 hours heating to 90–100° C. The 4-methyl-5-aminoethylthiazole is formed with the evolution of nitrogen. It may be separated by excess solid potassium hydroxide.

14.3 parts by weight of 4-methyl-5-aminoethyl-thiazole are dissolved in 120 parts by weight of 15 per cent sulfuric acid and treated with a concentrated solution of 7.5 parts by weight of sodium nitrite while cold. After standing over night the mixture is supersaturated with potassium carbonate and the 4-methyl-5-hydroxyethylthiazole formed is extracted with ether. It displays the properties indicated in Example 1.

*Example 3.*—223 parts by weight of β-bromolevulinic acid ethyl ester (compare Ber. d. deutschen Chem. Ges. 17, page 2285) and 200 parts by weight of barium thiocyanate are poured into 100 parts by weight of alcohol while stirring for 15 hours. The mixture is treated with water and extracted with ether. After evaporation of the ether crude β-thiocyano-levulinic acid ethyl ester remains. 83 parts by weight are added drop by drop to a boiling solution of 30 parts by weight of concentrated sulfuric acid in 300 parts by weight of alcohol and heated to boiling for 2 hours under reflux. The alcohol is distilled off under reduced pressure, the residue is treated with water and sodium carbonate and the 2-hydroxy-4-methylthiazolyl-5-acetic acid ethyl ester separated is filtered with suction. It melts at 97° C.

8 parts by weight of this ester are heated to boiling for 2 hours with 40 parts by weight of phosphorus oxychloride and worked up as indicated in Example 1. The 2-chloro-4-methyl-thiazolyl-5-acetic acid ethyl ester boiling at 132° C. under 8 mm. pressure is obtained. By reduction with zinc dust as indicated in Example 1 or with hydrogen in the presence of palladium the 4-methylthiazole-5-acetic acid ethyl ester is obtained as an oil boiling at 123° C. under 8 mm. pressure.

*Example 4.*—206 grams of acetopropylalcoholbenzoate (obtained by the action of benzoyl chloride upon acetopropylalcohol in the presence of pyridine, boiling at 167–168° C. under 3 mm. pressure) are dissolved in 600 ccs. of ether and gradually treated at 0–5° C. with 160 grams of bromine. The ethereal solution is washed with water and the ether is distilled off under reduced pressure. The residue is introduced into 200 ccs. of alcohol with 120 grams of potassium thiocyanate while stirring for 15 hours at 30° C. The mixture is treated with water and extracted with ether. After the ether has evaporated the residue is added to 100 ccs. of concentrated sulfuric acid drop by drop at 30–35° C. The sulfuric acid solution is poured on to ice and extracted with ether. On concentrating the solution the 2-hydroxy-4-methyl-5-benzoyl-oxyethyl-thiazole crystallizes out. From alcohol colorless crystals are obtained which melt at 148° C.

The same compound is obtained when using instead of 120 grams of potassium thiocyanate 130 grams of calcium thiocyanate and working in the same manner.

15 grams of the said compound are boiled with 40 grams of phosphorus oxychloride for half an hour under reflux. The excess phosphorus oxychloride is distilled off and the residue treated with water and ammonia while cooling. Thereby the 2-chloro-4-methyl-5-benzoyl-hydroxy-ethyl-thiazole separates as a light oil. The latter is dissolved in ether, the ether is evaporated, heated to 80° C. in 30 grams of glacial acetic acid and gradually treated with 10 grams of zinc dust. The mixture is then heated for another half hour to 80–90° C., diluted with water and neutralized at 0° C. with aqueous caustic soda solution. By extraction with ether the 4-methyl-5-benzoyl-oxyethyl-thiazole is obtained. Its picrate melts at 189° C.

For splitting off the benzoyl radical the mixture is boiled for one hour with alcoholic caustic potash solution, the alcohol is removed by steam distillation and the 4-methyl-5-hydroxyethyl-thiazole is separated from the saturated potassium carbonate solution as indicated in Example 1. It has the same properties as the product described in Example 1.

*Example 5.*—58 grams of bromopropyl methylketone (compare Ber. d. d. chem. Ges. 22 (1899), page 1206) are treated at 0° C. in 200 ccs. of ether with 57 grams of bromine, the ether is freed from hydrogen bromide by washing with water and sodium carbonate and dried over calcium chloride. After the ether has evaporated the methyl-1.3-dibromopropylketone is obtained as an oil boiling at 85° C. under 5 mm. pressure.

81 grams of methyl-1.3-dibromopropylketone in alcohol are mixed with 60 grams of lead rhodanide while stirring for 12 hours. The mixture is taken up in either, washed with water and dried over calcium chloride. After the ether has evaporated the crude 1-bromo-3-rhodan-4-ketopentane of the following composition

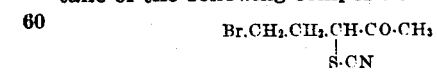

is obtained as a reddish oil. 63 grams of this compound are added drop by drop to 100 grams of concentrated sulfuric acid at 10–20° C., the solution is poured on to 200 grams of ice, filtered with suction and washed with water. The crude product is purified by crystallization from a large quantity of ether. In this manner the 2-hydroxy-4-methyl-5-($\beta$-bromoethyl)-thiazole is obtained in colorless crystals which melt at 170° C.

The same product is obtained when using instead of the lead rhodanide about 22 grams of thiocyanic acid with the addition of an equivalent quantity of base, such as barium hydroxide, ammonia, triethylamine or the like and working in the manner indicated above.

5 grams of the said compound are boiled with 5 grams of dehydrated potassium acetate and 20 ccs. of glacial acetic acid for 2 hours under reflux. The mixture is diluted with water, the solution saturated with potassium carbonate and extracted with ether. The etheral solution is strongly concentrated and cooled. Thereby the 2-hydroxy-4-methyl-5-acetoxyethylthiazole separates in colorless crystals melting at 86° C. It is identical with the intermediate product described in Example 1 and is further worked up as indicated therein.

We claim:—

1. The progress which comprises reacting upon an aliphatic ketone, containing in $\alpha$-position to the keto group a halogen atom and containing attached to the halogenated carbon atom a lower alkyl group which is substituted by a substituent selected from the group consisting of esterified hydroxy groups, halogen and amino, carboxylic, carbalkoxy and carboxylic acid-amide and hydrazide groups with a rhodanide and treating the reaction product obtained with an acid condensing agent to form a 2-hydroxy-thiazole compound.

2. Process as claimed in claim 1, in which the 2-hydroxyl group of the 2-hydroxy-thiazole compound is converted into halogen by means of a phosphorous halide and the 2-halogen atom thus formed is substituted by hydrogen by treatment with a reducing agent.

3. 2-hydroxy-4-methyl - 5 - acyloxyethyl - thiazoles.

4. The process which comprises reacting upon an aliphatic ketone, containing in $\alpha$-position to the keto group a halogen atom and containing attached to the halogenated carbon atom a lower alkyl group which is substituted by an esterified hydroxyl group, with a rhodanide and treating the reaction product obtained with an acid condensing agent to form a 2-hydroxy-thiazole compound.

5. The process which comprises reacting upon an aliphatic ketone, containing in $\alpha$-position to the keto group a halogen atom and containing attached to the halogenated carbon atom a lower alkyl group which is substituted by an esterified hydroxy group, with a rhodanide and treating the reaction product obtained with an acid condensing agent to form a 2-hydroxy-thiazole compound, converting the 2-hydroxyl group into halogen by means of a phosphorus halide and the 2-halogen atom thus formed into hydrogen by treatment with a reducing agent.

6. The process which comprises reacting upon an aliphatic ketone, containing in $\alpha$-position to the keto group a halogen atom and containing attached to the halogenated carbon atom a lower alkyl group which is substituted by an esterified hydroxy group, with a rhodanide and treating the reaction product obtained with an acid condensing agent to form a 2-hydroxy-thiazole compound, converting the 2-hydroxyl group into halogen by means of a phosphorus halide and the 2-halogen atom thus formed into hydrogen by treatment with a reducing agent, and transforming the esterified hydroxyl group substituting the alkyl group in the 5-position of the thiazole compound formed into hydroxyl by saponification.

7. The process which comprises reacting upon a $\gamma$-halogen-$\gamma$-aceto-propanolester with a rhodanide and treating the $\gamma$-rhodan-$\gamma$-aceto-propanolester formed with an acid condensing agent to form a 2-hydroxy-4-methylthiazolyl-5-ethanolester.

8. The process which comprises reacting upon a γ-halogen-γ-aceto-propanolester with a rhodanide, treating the γ-rhodan-γ-aceto-propanolester formed with an acid condensing agent to form a 2-hydroxy-4-methylthiazolyl-5-ethanolester and converting the 2-hydroxyl group into halogen by means of a phosphorus halide and the 2-halogen atom into hydrogen by treatment with a reducing agent.

9. The process which comprises reacting upon a γ-halogen-γ-aceto-propanolester with a rhodanide, treating the γ-rhodan-γ-aceto propanolester formed with an acid condensing agent to form a 2-hydroxy-4-methylthiazolyl-5-ethanolester, converting the 2-hydroxyl group into halogen by means of a phosphorus halide and the 2-halogen atom into hydrogen by treatment with a reducing agent, and transforming the ester group into hydroxyl by saponification.

10. The process which comprises reacting upon a γ-bromo-γ-aceto-propanolester with a rhodanide and treating the γ-rhodan-γ-aceto-propanolester formed with an acid condensing agent to form a 2-hydroxy-4-methylthiazolyl-5-ethanolester.

11. The process which comprises reacting upon a γ-bromo-γ-aceto-propanolester with a rhodanide, treating the γ-rhodan-γ-acetopropanolester formed with an acid condensing agent to form a 2-hydroxy-4-methylthiazolyl-5-ethanolester and converting the 2-hydroxyl group into halogen by means of a phosphorus halide and the 2-halogen atom into hydrogen by treatment with a reducing agent.

12. The process which comprises reacting upon a γ-bromo-γ-aceto-propanolester with a rhodanide, treating the γ-rhodan-γ-aceto-propanolester formed with an acid condensing agent to form a 2-hydroxy-4-methylthiazolyl-5-ethanolester and converting the 2-hydroxyl group into halogen by means of a phosphorus halide and the 2-halogen atom into hydrogen by treatment with a reducing agent, and transforming the ester group into hydroxyl by saponification.

13. The process which comprises reacting upon γ-bromo-γ-aceto-propanolbenzoate with a rhodanide and treating the γ-rhodan-γ-acetopropanolbenzoate formed with an acid condensing agent to form a 2-hydroxy-4-methyl-thiozolyl-5-ethanolbenzoate.

14. The process which comprises reacting upon γ-bromo-γ-aceto-propanolbenzoate with a rhodanide and treating the γ-rhodan-γ-acetopropanolbenzoate formed with an acid condensing agent to form the 2-hydroxy-4-methyl-thiazolyl-5-ethanolbenzoate, converting the 2-hydroxyl group into halogen by means of a phosphorus halide and the 2-halogen atom into hydrogen by treatment with a reducing agent.

15. The process which comprises reacting upon γ-bromo-γ-aceto-propanolbenzoate with a rhodanide treating the γ-rhodan-γ-aceto-propanolbenzoate formed with an acid condensing agent to form the 2-hydroxy-4-methyl-thiazolyl-5-ethanolbenzoate, converting the 2-hydroxyl group into halogen by means of a phosphorus halide and the 2-halogen atom into hydrogen by treatment with a reducing agent, and transforming the ester group into hydroxyl by saponification.

16. The process which comprises reacting upon an aliphatic ketone, containing in α-position to the keto group a halogen atom and containing attached to the halogenated carbon atom a halogenated lower alkyl group, with a rhodanide and treating the reaction product obtained with an acid condensing agent to form a 2-hydroxy-thiazole compound.

17. The process which comprises reacting upon an aliphatic ketone, containing in α-position to the keto group a halogen atom and containing attached to the halogenated carbon atom a halogenated lower alkyl group, with a rhodanide, treating the reaction product obtained with an acid condensing agent to form a 2-hydroxy-thiazole compound, and acting upon the latter with a salt of an organic acid to convert the halogen alkyl group standing in the 5-position into an acyloxy-alkyl group.

18. The process which comprises reacting upon an aliphatic ketone, containing in α-position to the keto group a halogen atom and containing attached to the halogenated carbon atom a halogenated lower alkyl group, with a rhodanide, treating the reaction product obtained with an acid condensing agent to form a 2-hydroxy-thiazole compound, acting upon the latter with a salt of an organic acid to convert the halogen alkyl group standing in the 5-position into an acyloxyalkyl group and converting the 2-hydroxyl group into halogen by means of a phosphorus halide and the 2-halogen atom thus formed into hydrogen by treatment with a reducing agent.

19. The process which comprises reacting upon a γ-halogen-γ-aceto-propylhalide with a rhodanide and treating the γ-rhodan-γ-aceto-propylhalide formed with an acid condensing agent to form a 2-hydroxy-4-methylthiazolyl-5-ethylhalide.

20. The process which comprises reacting upon a γ-halogen-γ-aceto-propylhalide with a rhodanide, treating the γ-rhodan-γ-aceto-propylhalide formed with an acid condensing agent to form a 2-hydroxy-4-methylthiazolyl-5-ethylhalide, and acting upon the latter with a salt of an organic acid to convert the halogen alkyl group standing in the 5-position into an acyloxyalkyl group.

21. The process which comprises reacting upon a γ-halogen-γ-aceto-propylhalide with a rhodanide, treating the γ-rhodan-γ-aceto-propylhalide formed with an acid condensing agent to form a 2-hydroxy-4-methylthiazolyl-5-ethylhalide, acting upon the latter with a salt of an organic acid to convert the halogen alkyl group standing in the 5-position into an acyloxyalkyl group and converting the 2-hydroxyl group into halogen by means of a phosphorus halide and the 2-halogen atom thus formed into hydrogen by treatment with a reducing agent.

22. The process which comprises reacting upon a γ-bromo-γ-aceto-propylbromide with a rhodanide and treating the γ-rhodan-γ-acetopropylbromide formed with an acid condensing agent to form the 2-hydroxy-4-methylthiazolyl-5-ethylbromide.

23. The process which comprises reacting upon a γ-bromo-γ-aceto-propylbromide with a rhodanide, treating the γ-rhodan-γ-aceto-propylbromide formed with an acid condensing agent to form the 2-hydroxy-4-methylthiazolyl-5-ethylbromide, and acting upon the latter with a salt of an organic acid to convert the halogen alkyl group standing in the 5-position into an acyloxyalkyl group.

24. The process which comprises reacting upon a γ-bromo-γ-aceto-propylbromide with a rhodanide, treating the γ-rhodan-γ-aceto-propylbromide formed with an acid condensing agent to form the 2-hydroxy-4-methylthiazolyl-5-ethylbromide, acting upon the latter with a salt of an organic acid to convert the halogen alkyl group standing in the 5-position into an acyloxyalkyl group and converting the 2-hydroxyl group into halogen by means of a phosphorus halide and the 2-halogen atom thus formed into hydrogen by treatment with a reducing agent.

25. Thiazoles having in 4-position a lower alkyl group and in 5-position a lower alkyl group substituted by a substituent selected from the group consisting of esterified hydroxyl groups, halogen atoms, amino, carboxylic, carbalkoxy and carboxylic acid-amide and hydrazide groups, which thiazoles are further substituted in the 2-position by a substituent selected from the group consisting of hydroxyl and halogen.

26. 4-methyl-thiazoles, having in 5-position an ethyl group substituted by an esterified hydroxyl group, which thiazoles are further substituted in the 2-position by a substituent selected from the group consisting of hydroxyl and halogen.

27. 4-Methyl-5-acetoxyethyl-thiazoles which are further substituted in the 2-position by a substituent selected from the group consisting of hydroxyl and halogen.

28. 4-Methyl-5-benzoyloxyethyl-thiazoles which are further substituted in the 2-position by a substituent selected from the group consisting of hydroxyl and halogen.

29. 2-Hydroxy-4-methyl-5-acetoxyethyl-thiazole.

30. 2-Chloro-4-methyl-5-acyloxyethyl-thiazoles.

31. 2-Chloro-4-methyl-5-acetoxyethyl-thiazole.

32. 2-Chloro-4-methyl-5-benzoyloxyethyl-thiazole.

HANS ANDERSAG.
KURT WESTPHAL.